United States Patent
Sriram et al.

(10) Patent No.: US 8,344,710 B2
(45) Date of Patent: Jan. 1, 2013

(54) VOLTAGE AND CURRENT REGULATION METHOD FOR A TWO-STAGE DC-DC CONVERTER CIRCUIT

(75) Inventors: Tillasthanam V. Sriram, Carmel, IN (US); Alexandre M. S. Reis, Kokomo, IN (US); Hua Zhou, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 435 days.

(21) Appl. No.: 12/704,857

(22) Filed: Feb. 12, 2010

(65) Prior Publication Data

US 2011/0199060 A1    Aug. 18, 2011

(51) Int. Cl.
*G05F 1/10* (2006.01)
(52) U.S. Cl. ..................................... 323/222; 323/224
(58) Field of Classification Search .................. 323/222, 323/234, 282–290, 351; 363/16, 17, 20, 363/24, 21.01, 21.06, 21.13, 21.15, 97, 132
See application file for complete search history.

(56) References Cited

U.S. PATENT DOCUMENTS

| | | | | |
|---|---|---|---|---|
| 4,947,311 | A * | 8/1990 | Peterson | 363/124 |
| 6,127,814 | A * | 10/2000 | Goder | 323/282 |
| 6,396,725 | B1 | 5/2002 | Jacobs et al. | |
| 6,961,251 | B2 * | 11/2005 | Porter et al. | 363/21.01 |
| 7,009,852 | B2 * | 3/2006 | Ying et al. | 363/17 |
| 7,330,366 | B2 * | 2/2008 | Lee et al. | 363/101 |
| 7,336,057 | B2 | 2/2008 | Hirabayashi | |
| 7,595,613 | B2 * | 9/2009 | Thompson et al. | 323/223 |

* cited by examiner

*Primary Examiner* — Rajnikant Patel
(74) *Attorney, Agent, or Firm* — Lawrence D. Hazelton

(57) ABSTRACT

A control methodology for a two-stage PWM DC-DC conversion system, with transformer-isolation, in which the converter circuit input voltage is compared to a set voltage calibrated as a function of the desired output voltage and the maximum voltage conversion ratio provided by the second-stage converter. When the input voltage is above the set voltage, the second-stage converter is controlled to provide both output voltage regulation during normal operation and output current limiting during over-current conditions. However, when the input voltage is below the set voltage, the first-stage converter is controlled to provide output voltage regulation with minor output current limiting, and the second-stage converter is controlled to provide extended output current limiting independent of the input voltage.

4 Claims, 2 Drawing Sheets

VOLTAGE AND CURRENT REGULATION METHOD FOR A TWO-STAGE DC-DC CONVERTER CIRCUIT

TECHNICAL FIELD

The present invention relates to a two-stage DC-DC conversion system, and more particularly to a novel control methodology providing improved operation thereof.

BACKGROUND OF THE INVENTION

DC-DC converter circuits are routinely used to power DC loads in systems where the source voltage is variable and/or not matched to the loads. The converter circuit can be controlled both to regulate the output voltage (i.e., the load voltage) during normal conditions, and to limit the output current (i.e., the load current) during over-current conditions. These two control functions can be segregated to a large extent with a two-stage converter topology in which one stage is controlled to provide output voltage regulation and the other stage is controlled to provide current limiting. For example, the U.S. Pat. No. 7,336,057 to Hirabayashi discloses a two-stage converter topology in which the first-stage provides output voltage regulation, the second-stage provides output current limiting, and transformer isolation allows the second-stage to limit output current independent of the input voltage if necessary. However, the voltage regulating capability of such two-stage converters is relatively limited, and the converter must be uniquely configured for nearly every application. Accordingly, what is needed is a two-stage DC-DC conversion system having both effective current limiting capability and enhanced voltage regulating capability.

SUMMARY OF THE INVENTION

The present invention is directed to an improved control methodology for a two-stage PWM DC-DC conversion system, with transformer-isolation, where the control methodology provides both effective current limiting and an extended range of voltage regulation for suitability to a variety of applications. The converter input voltage is compared to a set voltage calibrated as a function of the desired output voltage and the maximum voltage conversion ratio provided by the second-stage of the converter circuit. When the input voltage is above the set voltage, the second-stage of the converter circuit is controlled to provide both output voltage regulation during normal operation and output current limiting during over-current conditions. However, when the input voltage is below the set voltage, the first-stage of the converter circuit is controlled to provide output voltage regulation with minor output current limiting, and the second-stage converter circuit is controlled to provide extended output current limiting independent of the input voltage.

DESCRIPTION OF THE PREFERRED EMBODIMENT

Figure 1:
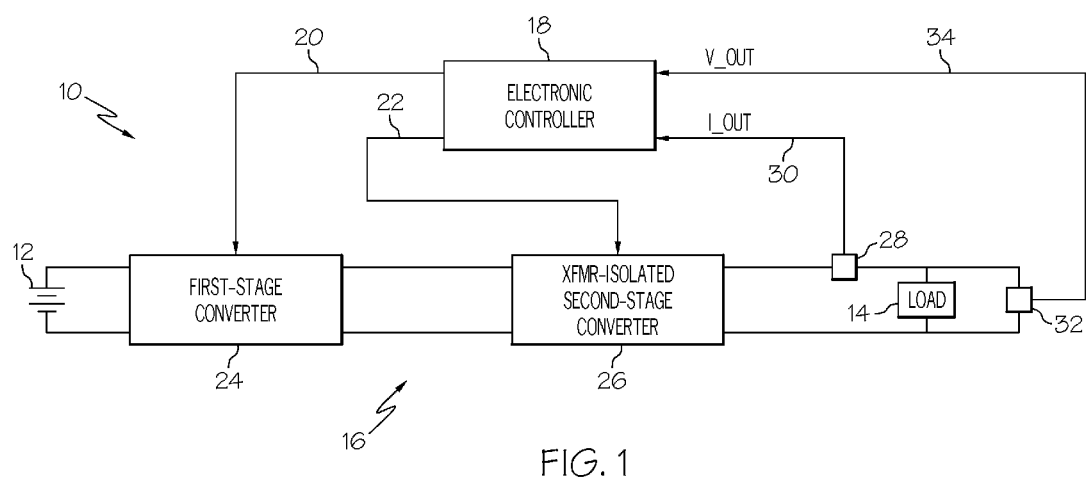
FIG. 1 is a block diagram of a two-stage PWM DC-DC conversion system according to this invention, including an electronic controller functioning as a PWM duty-cycle controller.

Referring to the drawings, and particularly to FIG. 1, the reference numeral 10 generally designates a PWM DC-DC conversion system for supplying power from a DC source 12 to a DC load 14. For example, the DC source 12 may be a battery pack of a hybrid electric vehicle, and the load 14 may be an automotive accessory. In general, the DC-DC conversion system 10 includes a PWM converter circuit 16 and an electronic controller 18 that supplies PWM duty-cycle commands to the converter circuit 16 via lines 20 and 22. The PWM converter circuit 16 is configured as a two-stage converter, with a first-stage converter 24 receiving an input voltage V_IN from the DC source 12, and a second-stage converter 26 coupling the first-stage converter's output to the load 14. The first-stage converter 24 is configured as a boost converter, while the second-stage converter 26 is configured as a transformer-isolated buck converter. Both converter topologies may be conventional in design, as shown for example in the aforementioned U.S. Pat. No. 7,336,057 to Hirabayashi.

The duty-cycle outputs of electronic controller 18 coordinate the operation of the first-stage and second-stage converters 24, 26 based on a set of calibrated control parameters and a pair of feedback signals. In the illustrated embodiment, the calibrated control parameters include a desired load voltage V_OUT_DES, an output current limit value I_SET, and a maximum PWM duty-cycle DC_BUCK_MAX for the second-stage converter 26. The feedback parameters include an output current signal I_OUT developed by current sensor 28 on line 30, and an output voltage feedback signal V_OUT developed by voltage sensor 32 on line 34.

In general, the electronic controller 18 coordinates the operation of the first-stage and second-stage converters 24, 26 to regulate the output voltage supplied to load 14 and to limit the current supplied to load 14 in the event of an over-current condition. The novelty of the control methodology lies in its ability to regulate (output voltage or output current) with either the first-stage converter 24 or the second-stage converter 26 as conditions require, and to seamlessly transition between voltage regulation and current regulation. The ability to regulate with either of the converters 24 or 26 allows the DC-DC conversion system 10 to be used in a range of applications with widely varying voltage conversion requirements, and even in applications where the source voltage V_IN is subject to substantial variation. The control methodology is described herein in the context of the flow diagram of FIG. 2, as though carried out by a microprocessor-based controller executing an embedded software routine. However, it will be understood that the methodology is quite independent of the implementation strategy, and that the electronic controller 18 may be implemented with analog or digital circuit elements as desired.

Figure 2:
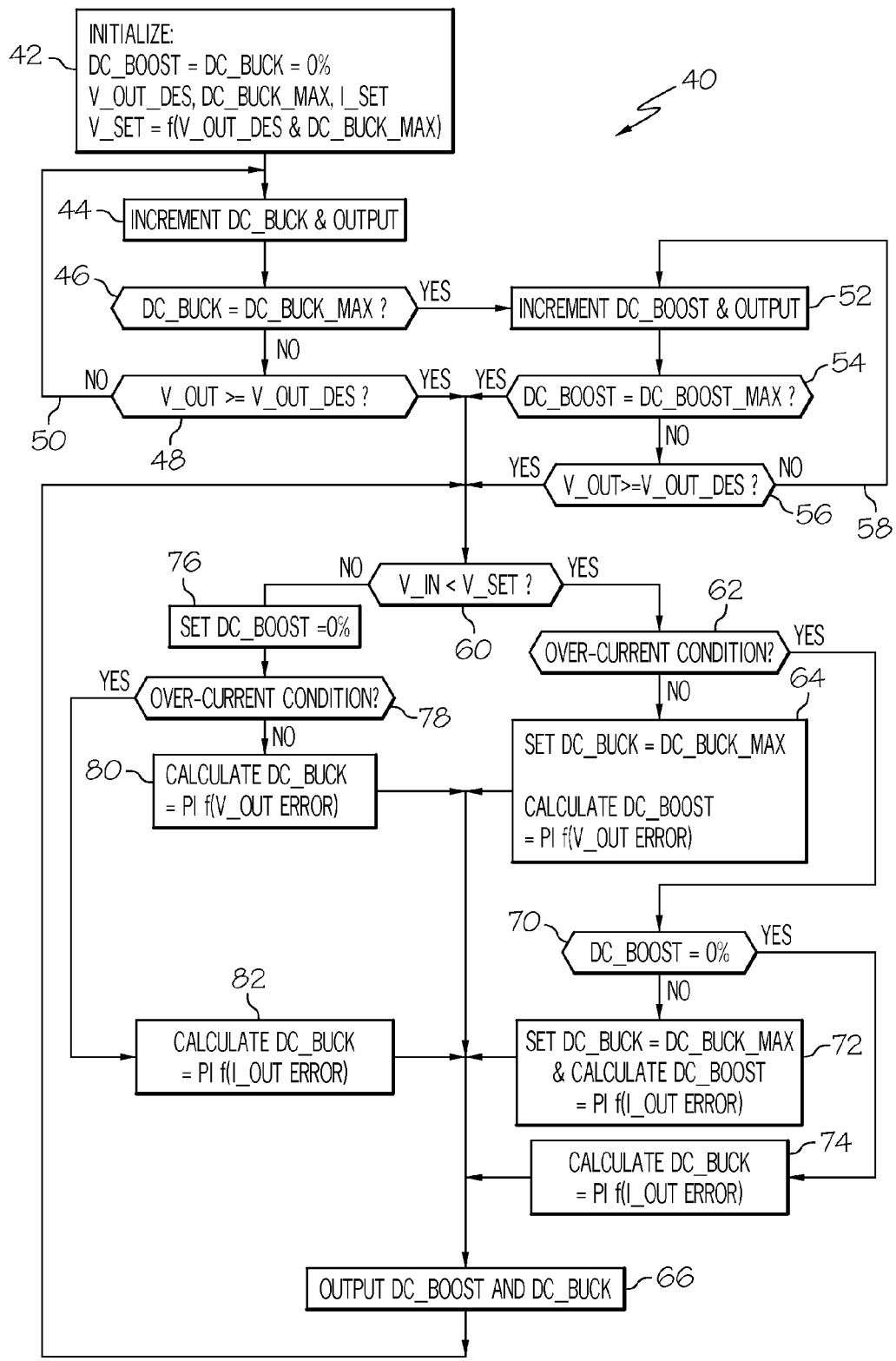
FIG. 2 is a flow diagram describing a control methodology carried out by the electronic controller of FIG. 1 according to this invention.

Referring now to the flow diagram of FIG. 2, the block 42 is initially executed to define a set of initial conditions. As indicated, the variables DC_BOOST and DC_BUCK for the first-stage and second-stage converters 24 and 26 are initialized to 0%, and the calibrated control parameters V_OUT_DES, I_SET and DC_BUCK_MAX are dialed in. At a 0% duty cycle, the first-stage converter 24 has a voltage conversion ratio of one-to-one, and the second-stage converter 26 has a voltage conversion ratio of zero due to the operation of its input transformer. The block 42 additionally computes a set voltage V_SET corresponding to the expected voltage at the input of second-stage converter 26 when the output voltage V_OUT is equal to V_OUT_DES and the second-stage converter 26 is operated at the specified maximum duty-cycle DC_BUCK_MAX. Accordingly, the computation requires foreknowledge of the maximum voltage conversion ratio (i.e., when DC_BUCK=DC_BUCK_MAX) of second-stage converter 26 and the turns-ratio of its input transformer, in addition to the desired output voltage V_OUT_DES.

Following initialization, the blocks 44-48 and 52-56 are executed to start-up the converter circuit 16. First, the blocks 44-48 ramp-up the duty-cycle command DC_BUCK of the second-stage converter 26 until the maximum duty-cycle DC_BUCK_MAX or the desired output voltage V_OUT_DES is reached. Initially, of course, block 46 will be answered in the negative, and block 44 will be iteratively executed to increase DC_BUCK, as indicated by block 48 and flow line 50. If the desired output voltage V_OUT_DES is reached before DC_BUCK=DC_BUCK_MAX, the start-up portion of the control is concluded, and the control proceeds to block 60 and the regulating portion of the control. However, if the maximum duty-cycle DC_BUCK_MAX is reached before V_OUT increases to the desired value V_OUT_DES, block 46 will be answered in the affirmative, and the blocks 52-56 will be executed to ramp-up the duty-cycle command DC_BOOST of the first-stage converter 24. As with DC_BUCK, the blocks 52-58 ramp-up DC_BOOST until DC_BOOST reaches a maximum value DC_BOOST_MAX (95%, for example) or V_OUT increases to the desired value V_OUT_DES. Initially, of course, block 54 will be answered in the negative, and block 52 will be iteratively executed to increase DC_BOOST, as indicated by block 56 and flow line 58. Typically, the desired output voltage V_OUT_DES is reached before DC_BOOST reaches DC_BOOST_MAX; and at such point, the start-up portion of the control is concluded, and the control proceeds to block 60 and the regulating portion of the control.

In the regulating portion of the control methodology, the block 60 is initially executed to compare the source or input voltage V_IN to the set voltage V_SET computed during initialization. If V_IN is less than V_SET, the first-stage boost converter 24 is required to satisfy the desired output voltage V_OUT_DES; in this case, the blocks 62-74 are repeatedly executed to regulate V_OUT, and limit the load current I_OUT if required. If V_IN is greater than V_SET, the first-stage boost converter 24 is not required to satisfy the desired output voltage V_OUT_DES; in this case, blocks 66 and 76-82 are repeatedly executed to maintain DC_BOOST at 0%, regulate V_OUT, and limit the load current I_OUT if required. In some applications, the source voltage V_IN will always be either above or below the set voltage V_SET, but in other applications, the source voltage V_IN will vary both above and below the set voltage V_SET, depending on operating conditions, and the control method outlined in FIG. 2 accommodates any of these applications.

In the case where V_IN is less than V_SET, the block 62 is executed to detect the presence of an over-current condition, as may be signified, for example, when the average value of feedback current I_OUT exceeds a calibrated set-point, or the temperature of load 14 exceeds a calibrated value. If block 62 is answered in the negative, the system is operating normally, and blocks 64-66 are executed to maintain the second-stage buck converter 26 at its maximum duty-cycle (DC_BUCK_MAX), and to set the duty-cycle of the first-stage boost converter 24 as required to regulate V_OUT at the desired value V_OUT_DES. As noted in block 64, the duty-cycle command DC_BOOST for the first-stage boost converter 24 is determined as a proportional-plus-integral (PI) function of the output voltage error V_OUT_ERROR, where V_OUT_ERROR is simply the difference between V_OUT_DES and the feedback voltage V_OUT.

However, if an over-current condition occurs, block 62 is answered in the affirmative, and the blocks 66 and 70-74 are executed to limit the output current by suitably controlling the first-stage and second-stage converters 24 and 26. In most cases, the duty-cycle of the first-stage boost converter 24 will initially be greater than 0%, and block 70 will direct the execution of block 72 to set the duty-cycle DC_BOOST of the first-stage boost converter 24 as required to regulate I_OUT at the over-current set value I_SET. As noted in block 72, DC_BOOST in this case is determined as a proportional-plus-integral (PI) function of the output current error I_OUT_ERROR, where I_OUT_ERROR is simply the difference between the feedback current I_OUT and the set value I_SET. If the duty-cycle regulator function of block 72 drives the duty-cycle DC_BOOST of the first-stage boost converter 24 down to 0%, however, the block 70 will direct the execution of block 74 instead of block 72. Block 74 maintains DC_BOOST at 0%, and sets the duty-cycle DC_BUCK of the second-stage buck converter 26 as required to regulate I_OUT at the calibrated limit value. In this case, DC_BUCK is determined as a proportional-plus-integral (PI) function of the output current error I_OUT_ERROR, as noted at block 74. If and when the over-current condition is resolved, block 62 will again be answered in the negative, and blocks 64-66 will be executed as discussed above to resume output voltage regulation.

In the case where V_IN is greater than V_SET, block 76 sets the duty-cycle DC_BOOST of first-stage converter 24 to 0%, and block 78 determines if an over-current condition is in effect. As mentioned above in respect to block 62, the presence of an over-current condition may be signified, for example, when the average value of feedback current I_OUT exceeds a calibrated set-point, or the temperature of the load 14 exceeds a calibrated value. If block 78 is answered in the negative, the system is operating normally, and blocks 80 and 66 are executed to set the duty-cycle of the second-stage buck converter 26 as required to regulate V_OUT at the desired value V_OUT_DES. As noted in block 80, the duty-cycle command DC_BUCK for the second-stage buck converter 26 is determined as a proportional-plus-integral (PI) function of the output voltage error V_OUT_ERROR, where V_OUT_ERROR is simply the difference between V_OUT_DES and the feedback voltage V_OUT.

However, if an over-current condition occurs, block 78 is answered in the affirmative, and the blocks 82 and 66 are executed to regulate the output current at the set value I_SET by suitably controlling the second-stage buck converter 26. As indicated at block 82, the duty-cycle DC_BUCK of the second-stage buck converter 26 is determined as a proportional-plus-integral (PI) function of the output current error I_OUT_ERROR, where I_OUT_ERROR is simply the difference between the feedback current I_OUT and the set value I_SET. If and when the over-current condition is resolved, block 78 will again be answered in the negative, and blocks 80 and 66 will be executed as discussed above to resume output voltage regulation.

In summary, the control disclosed methodology retains the effective current limiting capability of the prior art, while substantially enhancing the conversion system's range of voltage regulation. This not only allows the conversion system 10 to be used in a wide variety of applications, but in also allows the system to operate effectively in applications where the source voltage V_IN is subject to substantial variation. While the present invention has been described with respect to the illustrated embodiment, it is recognized that numerous modifications and variations in addition to those mentioned herein will occur to those skilled in the art. For example, the converter controls may be of the PID or peak-current type instead of the illustrated PI controls, if desired. Accordingly, it is intended that the invention not be limited to the disclosed embodiment, but that it have the full scope permitted by the language of the following claims.

The invention claimed is:

1. A method of operation for a DC-DC converter configured to supply power from a voltage source to an electrical load, the DC-DC converter including a first-stage boost converter coupled to the voltage source and a transformer-isolated second-stage buck converter coupled between an output of the first-stage boost converter and the electrical load, the method comprising the steps of:

starting the DC-DC converter according to a prescribed sequence;
   determining a set voltage based on a prescribed output voltage and a maximum voltage conversion ratio of the second-stage buck converter;
   sampling the source voltage and comparing it to the set voltage;
   so long as the source voltage is above the set voltage, controlling the second-stage buck converter to provide both output voltage regulation under normal conditions and output current regulation under over-current conditions; and
   so long as the input voltage is below the set voltage, controlling the first-stage boost converter to provide output voltage regulation under normal conditions and limited output current regulation under over-current conditions, and controlling the second-stage buck converter to provide extended output current regulation independent of the input voltage under over-current conditions.

2. The method of operation of claim 1, where:
   the set voltage is an expected voltage at the output of the first-stage boost converter when the output voltage is equal to the desired output voltage and the second-stage buck converter is operated at a prescribed maximum duty-cycle.

3. The method of operation of claim 1, where the first-stage boost converter and the second-stage buck converter are controlled according to PWM duty-cycle commands, and the step of starting the DC-DC converter includes the steps of:
   initializing the duty-cycle commands of the first-stage boost converter and the second-stage buck converter to 0%;
   ramping-up the duty-cycle of the second-stage buck converter until it reaches a prescribed maximum duty cycle, or the output voltage reaches the prescribed output voltage, whichever occurs first; and
   if the duty-cycle of the second-stage buck converter reaches the prescribed maximum duty cycle, ramping-up the duty-cycle of the first-stage boost converter until the output voltage reaches the prescribed output voltage.

4. The method of operation of claim 3, including the step of:
   terminating the ramping-up of the duty-cycle of the first-stage boost converter if its duty cycle reaches a maximum allowable duty-cycle.

* * * * *